United States Patent
Dolph et al.

(10) Patent No.: US 9,628,433 B2
(45) Date of Patent: Apr. 18, 2017

(54) TRANSMISSION OF SHORT MESSAGE SERVICE (SMS) MESSAGE AND NOTIFICATIONS IN VIRTUALIZED WIRELESS MOBILE COMPUTING DEVICE BASED ON THE STATUS OF INTENDED RECIPIENT

(71) Applicant: International Business Machines Corporation, Armonk, NY (US)

(72) Inventors: Blaine H. Dolph, Western Springs, IL (US); Miku K. Jha, New York, NY (US); Sandeep R. Patil, Pune (IN); Gandhi Sivakumar, Victoria (AU); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 14/010,623

(22) Filed: Aug. 27, 2013

(65) Prior Publication Data

US 2015/0067065 A1 Mar. 5, 2015

(51) Int. Cl.
*H04L 12/58* (2006.01)
*G06F 9/455* (2006.01)

(52) U.S. Cl.
CPC .......... *H04L 51/38* (2013.01); *G06F 9/45558* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 6,636,721 | B2* | 10/2003 | Threadgill | H04B 7/18506 455/12.1 |
| 7,228,337 | B1* | 6/2007 | Bornstein | H04L 29/12367 709/217 |
| 8,332,517 | B2 | 12/2012 | Russell | |
| 8,340,633 | B1 | 12/2012 | Rege et al. | |
| 9,066,291 | B1* | 6/2015 | Chen | H04W 52/0212 |
| 9,191,454 | B2* | 11/2015 | Fries | H04L 67/2861 |
| 2003/0037178 | A1* | 2/2003 | Vessey | G06F 9/54 719/319 |
| 2003/0187775 | A1* | 10/2003 | Du | G06F 9/441 705/37 |
| 2010/0037206 | A1 | 2/2010 | Larimore et al. | |
| 2010/0217916 | A1* | 8/2010 | Gao | G06F 12/109 711/6 |
| 2010/0330967 | A1* | 12/2010 | Chiu | G06Q 10/109 455/412.2 |
| 2011/0141124 | A1* | 6/2011 | Halls | G06F 21/83 345/522 |

(Continued)

*Primary Examiner* — Abu Ghaffari
(74) *Attorney, Agent, or Firm* — Robert C. Bunker

(57) ABSTRACT

A method for transmitting short message service (SMS) messages and notifications within a virtualized wireless device is provided. In one embodiment, a hypervisor detects an incoming SMS message directed to a virtualized wireless device that comprises at least two virtual operating systems. The hypervisor further transmits the incoming SMS message to a first virtual operating system of the virtualized wireless device. In addition, the hypervisor notifies a second virtual operating system of the virtualized wireless device of the incoming SMS message.

9 Claims, 5 Drawing Sheets

(56) References Cited

U.S. PATENT DOCUMENTS

| | | | | |
|---|---|---|---|---|
| 2011/0200180 A1* | 8/2011 | McCarthy | H04M 3/533 | 379/88.08 |
| 2011/0302262 A1* | 12/2011 | Clark | H04L 12/587 | 709/206 |
| 2012/0005691 A1* | 1/2012 | Wong | G06F 9/541 | 719/319 |
| 2012/0079045 A1* | 3/2012 | Plotkin | H04L 12/585 | 709/206 |
| 2012/0089663 A1* | 4/2012 | Sedayao | H04W 4/00 | 709/202 |
| 2012/0159139 A1* | 6/2012 | Kim | H04M 1/72563 | 713/2 |
| 2012/0210086 A1* | 8/2012 | Bauman | H04L 67/1097 | 711/165 |
| 2012/0226740 A1* | 9/2012 | Nath | H04L 67/125 | 709/203 |
| 2012/0226759 A1* | 9/2012 | Lew | H04L 12/588 | 709/206 |
| 2012/0289219 A1* | 11/2012 | Parmar | H04M 3/523 | 455/419 |
| 2013/0017845 A1* | 1/2013 | Gudala | H04W 4/14 | 455/466 |
| 2013/0040670 A1* | 2/2013 | Fok | H04L 12/581 | 455/466 |
| 2013/0089106 A1* | 4/2013 | Tsirkin | H04L 49/9057 | 370/412 |
| 2013/0303133 A1* | 11/2013 | Sansalone | H04M 1/72519 | 455/414.1 |
| 2013/0303212 A1* | 11/2013 | Plimmer | H04L 51/38 | 455/466 |

\* cited by examiner

TRANSMISSION OF SHORT MESSAGE SERVICE (SMS) MESSAGE AND NOTIFICATIONS IN VIRTUALIZED WIRELESS MOBILE COMPUTING DEVICE BASED ON THE STATUS OF INTENDED RECIPIENT

FIELD OF THE INVENTION

The present invention relates generally to the field of virtualized mobile computing devices, and more particularly to transmission of SMS messages and notifications of the SMS messages in operating systems of virtualized mobile computing devices.

BACKGROUND OF THE INVENTION

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use a thin layer of code in software or firmware to achieve fine-grained, dynamic resource sharing. Hypervisors are the primary technology for system virtualization because they provide the greatest level of flexibility in how virtual resources are defined and managed.

Hypervisors also provide the ability to divide physical computing system resources into isolated logical partitions. Each logical partition operates like an independent computing system running its own operating system (e.g., a virtual system). Operating systems running in a virtualized environment are often referred to as "guest machines." Hypervisors can allocate dedicated processors, I/O adapters, and memory to each logical partition and can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments. The hypervisor can also dynamically allocate and de-allocate dedicated or shared resources (such as processors, I/O, and memory) across logical partitions while the partitions are actively in use. This is known as dynamic logical partitioning, or dynamic LPAR, and allows the hypervisor to dynamically redefine all available system resources to reach optimum capacity for each partition.

In addition to creating and managing the logical partitions, the hypervisor manages communication between the logical partitions via a virtual switch. To facilitate communication, each logical partition may have a virtual adapter for communication between the logical partitions, via the virtual switch. The type of the virtual adapter depends on the operating system used by the logical partition. Examples of virtual adapters include virtual Ethernet adapters, virtual Fibre Channel adapters, virtual Small Computer Serial Interface (SCSI) adapters, and virtual serial adapters. Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS. The VIOS can provide virtualized network resources to the other logical partitions via a Shared Ethernet adapter (SEA). The SEA bridges a physical Ethernet adapter with the respective virtual adapters and may apportion network bandwidth.

SUMMARY

In one embodiment, a method is provided for transmitting short message service (SMS) within a virtualized wireless device. The method further comprises detecting an incoming SMS message directed to a virtualized wireless device that comprises at least two virtual operating systems. The method further comprises transmitting the incoming SMS message to a first virtual operating system of the virtualized wireless device. The method further comprises notifying a second virtual operating system of the virtualized wireless device of the incoming SMS message.

In another embodiment, a computer system is provided for transmitting short message service (SMS) within a virtualized wireless device. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to detect an incoming SMS message directed to a virtualized wireless device that comprises at least two virtual operating systems. The computer system further comprises program instructions to transmit the incoming SMS message to a first virtual operating system of the virtualized wireless device. The computer system further comprises program instructions to notify a second virtual operating system of the virtualized wireless device of the incoming SMS message In yet another embodiment, a computer program product is provided for transmitting short message service within a virtualized wireless device. The computer program product comprises one or more computer-readable tangible storage devices and program instructions stored on at least one of the one or more storage devices. The computer program product further comprises program instructions to detect an incoming SMS message directed to a virtualized wireless device that comprises at least two virtual operating systems. The computer program product further comprises program instructions to transmit the incoming SMS message to a first virtual operating system of the virtualized wireless device. The computer program product further comprises program instructions to notify a second virtual operating system of the virtualized wireless device of the incoming SMS message.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

DETAILED DESCRIPTION

Embodiments of the present invention provide a mobile computing device including a hypervisor that transmits short message service (SMS) messages and notifications within virtual operating systems of the mobile computing device. For example, the hypervisor transmits the SMS message to an SMS message thread of a first virtual operating system of the mobile computing device, while also transmitting a notification of the SMS message to a second virtual operating system of the mobile computing device, in accordance with at least one embodiment.

Transmission of the SMS message is managed by the hypervisor, wherein management of the SMS message is configured manually by a user of the mobile computing device, or automatically by the hypervisor in a control network interface of either the first virtual operating system or the second virtual operating system. The configuration can include, for example, indication of a sequence in which the SMS message is transmitted by the hypervisor. The hypervisor can also be configured to concurrently transmit the SMS message to the SMS message thread of either of the first virtual operating system, or the second virtual operating systems based on, for example, a sequential order indicated by the user in the control network interface, or based on when the SMS message is received by the mobile computing device. Moreover, if either of the first virtual operating system or the second virtual operating system is inactive, the hypervisor is adapted to create an SMS queue that allows the hypervisor to store the SMS message in the mobile computing device, while also transmitting a notification of the SMS message to either of an active first virtual operating system or an active second virtual operating system of the mobile computing device.

For example, according to at least one embodiment, either of the first virtual operating system or the second virtual operating system is active or activated when it is manually or automatically powered on and displays a default home user configuration screen of the SMS message in the control network interface. Entry into an active or off mode by either of the first virtual operating system or the second virtual operating system may be configured automatically, by default by the mobile computing device, or manually by the user in the control network interface, wherein the user selects a manner in which to notify the user of the incoming SMS message transmitted by the hypervisor to either of the first virtual operating system or the second virtual operating system.

Figure 1:
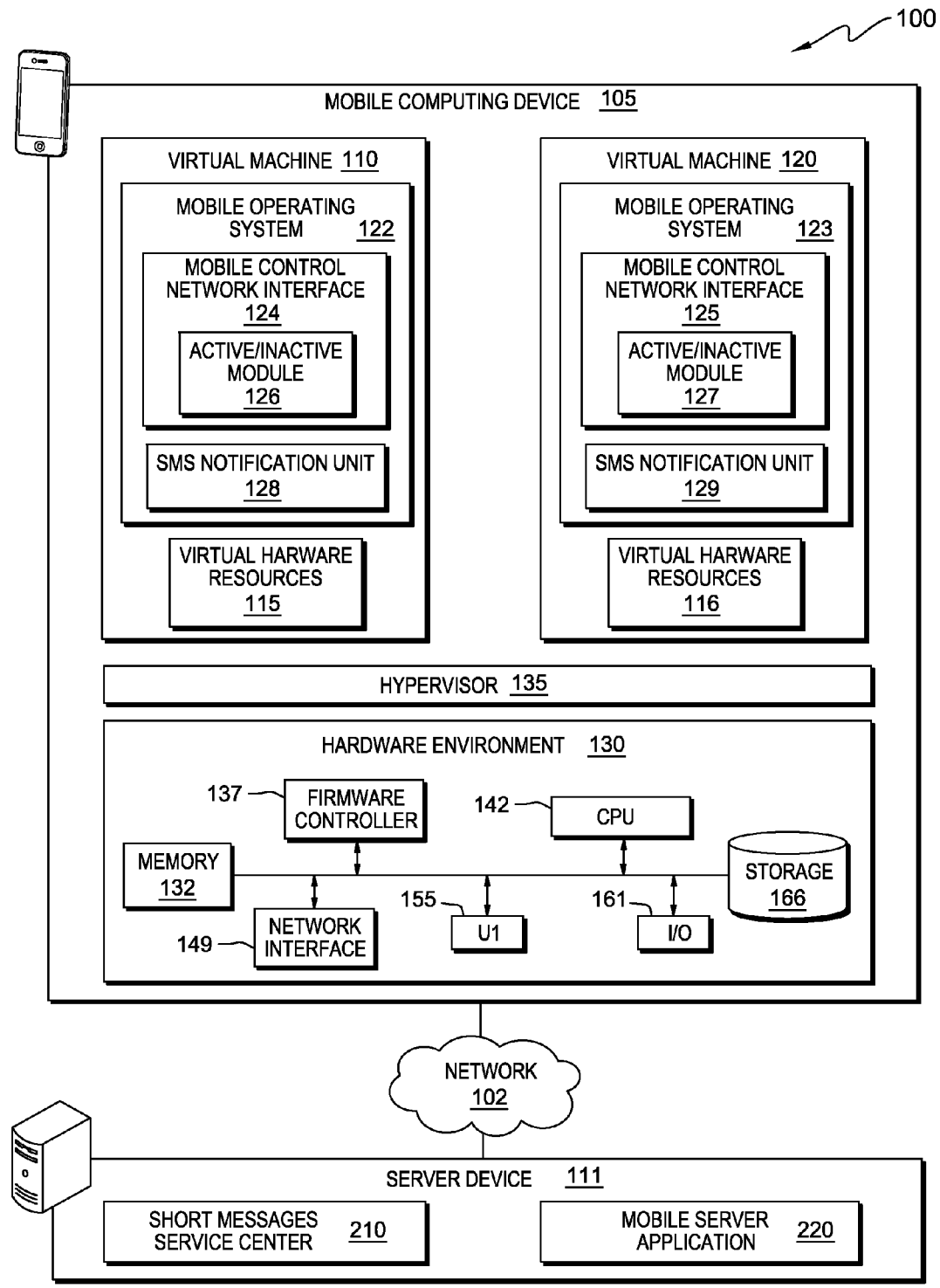
FIG. 1 is a block diagram of a mobile communications environment, in accordance with embodiments of the present invention.

Embodiments of the present invention will now be described in detail with reference to the accompanying Figures. Referring now to FIG. 1, mobile communications environment 100 for transmitting SMS messages between a first virtual operating system and a second virtual operating system of mobile communications environment 100 is shown. Mobile communications environment 100 implements a mobile virtualized computing platform for transmitting SMS messages, and notifications of the SMS messages, between the first virtual operating system and the second virtual operating system. For example, mobile communications environment 100 can include a hardware virtualization system that enables multiple operating systems or virtual machines to run or operate simultaneously, and transmit SMS messages between a first virtual operating system and the second virtual operating system of mobile communications environment 100. Mobile communications environment 100 includes mobile computing device 105, server device 111, and network 102. Mobile computing device 105 and server device 111 are interconnected over network 102. Mobile computing device 105 can be, for example, a laptop, tablet, or notebook personal computer (PC), a desktop computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Mobile computing device 105 includes virtual machines (VM) 110, 120, hypervisor 135 and hardware environment 130. VM 110, 120 provide system platforms that supports the execution of mobile operating system (OS) 122 and mobile operating system (OS) 123. VM 110, 120 operates mobile OS 122 and mobile OS 123 in communication with hypervisor 135 for executing applications for transmitting SMS messages between either of mobile OS 122 and mobile OS 123 in mobile communications environment 100. Mobile OS 122 and mobile OS 123 can be, for example, Android® (Android is a trademark of Google Inc. in the United States other countries or both) or Blackberry® OS (Blackberry is a trademark of Blackberry, Inc. in the United States, other countries, or both). VM 110, 120 may further include virtual hardware resources 115, 116, which can include for example, virtual processors, virtual disks, virtual memory or virtual network interfaces that are allocated to VM 110, 120 for executing program operations of mobile OS 122 and mobile OS 123. Hypervisor 135 virtualizes virtual hardware resources 115, 116 of VM 110, 120, and controls processor scheduling and memory partitions for VM 110, 120, as described below, in accordance with at least one embodiment.

According to at least one embodiment, hypervisor 135 transmits SMS messages from a short message service center (SMSC) of mobile communications environment 100 to an SMS message thread of either of mobile OS 122 or mobile OS 123, while also transmitting a notification of the SMS message to either of mobile OS 122 or mobile OS 123. Further, if either of mobile OS 122 or mobile OS 123 is inactive, hypervisor 135 creates an SMS queue that allows hypervisor 135 to store the SMS messages in mobile computing device 105, while also transmitting a notification of the SMS messages to either of an active mobile OS 122 or mobile OS 123. Mobile OS 122 and mobile OS 123 execute mobile control network interface 124, 125, respectively.

Mobile control network interfaces 124, 125 operate to configure notification of the SMS messages transmitted by hypervisor 135 between either of mobile OS 122 and mobile OS 123.

Mobile control network interfaces 124, 125 can be a mobile web browser application, a standalone mobile web page SMS transmission application, or part of a service that monitors and interacts with a mobile web browser or SMS transmission application of VM 110, 120. Moreover, mobile control network interfaces 124, 125 can, among other things, retrieve and display mobile content of mobile communications environment 100 via network 102 on VM 110, 120. For example, mobile control network interfaces 124, 125 can be a mobile web browser. The mobile web browser of mobile control network interfaces 124, 125 can be a mobile software application for retrieving, presenting and traversing SMS messages, or other mobile information resources transmitted to either of mobile OS 122 and mobile OS 123 by hypervisor 135, as described below. Mobile control network interfaces 124, 125 include active/inactive modules 126, 127. According to at least one embodiment, either of mobile OS 122 and mobile OS 123 is active or activated when VM 110, 120 is manually or automatically powered on in active/inactive modules 126, 127. For example, entry into the active or on mode by either of mobile OS 122 and mobile OS 123 may be configured automatically, by default by active/inactive modules 126, 127, wherein the automatic configuration can be based on geographic origination of the SMS messages to SMSC 210, specific time that the SMS message transits SMSC 210, or subject matter, including, for example, an urgent message notification of the SMS messages. In this manner, hypervisor 135 can automatically transmit the SMS message to an active virtual mobile OS 122 or mobile OS 123 based on the defined rules of VM 110, 120, in accordance with at least one embodiment. Also, entry into the active or on mode can also be manually configured by the user of mobile computing device 105 in the mobile control network interfaces 124, 125, wherein the user can select a manner in which to notify the user of the incoming SMS message transmitted by hypervisor 135 to either of mobile OS 122 or mobile OS 123.

Furthermore, the manner of manual transmission of the SMS messages to either of an active or inactive mobile OS 122 or mobile OS 123 by the user can be based on geographic origination of SMSC 210 of mobile communications environment 100, specific time of the SMS message at SMSC 210, or subject matter, including, for example, an urgent message notification of the SMS messages, as described below, in accordance with the present invention. For example, an active mobile OS 122 and mobile OS 123 can display an active default home user configuration screen in active/inactive modules 126, 127 for displaying the transmitted SMS messages or notification of SMS message of on active/inactive interfaces 126, 127 of either of mobile OS 122 and mobile OS 123.

Entry into an inactive or off mode by either of mobile OS 122 and mobile OS 123 may involve disabling the active/inactive interfaces 126, 127 of mobile control network interfaces 124, 125. For example, entry into the inactive or off mode may be configured automatically, by default by active/inactive interfaces 126, 127 or by the user in active/inactive interfaces 126, 127, wherein the user selects a manner in which to notify the user of the incoming SMS message transmitted by hypervisor 135, in accordance with at least one embodiment. Each of mobile OS 122 and mobile OS 123 further includes SMS notification units 128, 129 for transmitting notifications of SMS messages between an active or inactive mobile OS 122 and mobile OS 123.

According to at least one embodiment, hypervisor 135 detects an incoming SMS message to mobile computing device 105, and transmits the incoming SMS message to an SMS thread of either of mobile OS 122, mobile OS 123 while also transmitting a notification of the SMS message to SMS notification units 128, 129 of mobile OS 122 and mobile 123. SMS notification units 128, 129 provide notification of existing or incoming SMS messages transmitted by hypervisor 135 to either of mobile OS 122 and mobile OS 123. For example, according to at least one embodiment, if an active/inactive module 126, 127 is inactive, hypervisor 135 creates an SMS queue within mobile computing device 105 to store the SMS message to an active mobile OS 122 or mobile OS 123 and also transmits a notification of the incoming SMS message to SMS notification unit 128, 129 of inactive mobile OS 122 or mobile OS 123. Hypervisor 135 is further adapted to enable the user of mobile computing device 105 to forward the incoming SMS messages within mobile computing device 105, and modify one or more user preferences on mobile control network interfaces 124, 125, for transmitting notifications of the SMS messages between an active or inactive mobile OS 122 or mobile OS 123.

Hardware environment 130 includes memory 132, network interface 149, firmware controller 137, user interface (UI) 155, I/O 161, CPU 142 and storage 166. Memory 132 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by other components of mobile computing device 105. In some embodiments, memory 132 provides a physical address space composed of addressable memory locations for one or more program applications that operate to execute program instructions in mobile computing device 105. Network interface 149 is adapted to transmit or receive communication over network 102 coupled to mobile computing device 105. Firmware controller 137 operates to internally control the circuits and subassemblies of mobile computing device 105. UI 155 comprises a peripheral to enable interaction between a system administrator or user and mobile computing device 105.

CPU 142 executes program instructions loaded into memory 132 from storage 166 in order to support execution of program applications in mobile computing device 105. CPU 142 may further comprise one or more processors such as a digital signal processor (DSP), an application specific integrated circuit (ASIC), a field programmable gate array (FPGA), or any other equivalent logic device. Therefore, the terms "processor" or "controller," as used herein, may refer to any one or more of the foregoing structures or any structure suitable for implementation of embodiments of the present invention. I/O 161 includes devices to process, propagate or display signals or data received or sent through circuits or subassemblies of circuits comprising mobile computing device 105.

Storage device 166 comprises computer-readable media, such as computer-readable storage media that includes volatile and/or non-volatile, removable and/or non removable media implemented in any method or technology for storage of information, such as, processor-readable instructions, data structures, program modules, or other data. Computer-readable media includes, but is not limited to, random access memory (RAM), read-only memory (ROM), EEPROM, FLASH memory or other optical storage, magnetic devices or any other medium that can be used to store the desired information and that can be accessed by other components of mobile computing device 105.

Network 102 includes one or more networks of any kind that can provide communication links between various devices and computers connected together within mobile communications environment 100. Network 102 also includes connections, such as wired communication links, wireless communication links, or fiber optic cables. Furthermore, network 102 can be implemented as a number of different types of networks, including, for example, a local area network (LAN), wide area network (WAN) or a packet switched telephone network (PSTN), or some other networked system. Network 102 can include the Internet representing a worldwide collection of networks.

Server device 111 can be, for example, a server computer system such as a management server, a web server, or any other electronic device or computing system capable of receiving and sending data, including, for example, transmitting SMS messages from one or more mobile computing devices operating within mobile communications environment 100, in accordance with an embodiment of the present invention. Further, server device 111 can also represent a "cloud" of computers interconnected by one or more networks, wherein server device 111 can be a primary server for a computing system utilizing clustered computers when accessed through network 102. For example, a cloud computing system can be an implementation of a mobile SMS messaging system for transmitting the SMS messages from requestors of one or more mobiles devices to a responder of mobile computing device 105. Server device 111 includes short message service center (SMSC) 210 and mobile server application 220.

According to at least one embodiment, SMSC 210 receives, stores, forwards, convert and deliver SMS messages to mobile server application 220. For example, the SMS messages are originated and received by service users or mobile server providers of mobile communications environment 100. The mobile service provider can be, for example, a telecommunications network provider of mobile communications environment 100, wherein the telecommunications network provider provides teleservices such as, for example, informational messaging or program messaging of the SMS messages to SMSC 210.

Mobile application server 220 provides a mobile framework for transmitting the SMS messages of SMSC 210 to hypervisor 135 of mobile computing device 105. The mobile framework can include, for example, a data transmission service, for transmitting data, including SMS messages of SMSC 210. For example, mobile application server 220 further acquires data, including SMS messages from SMSC 210, or other database applications, or queries of server device 111, and transmits the SMS messages to hypervisor 135, wherein hypervisor 135 further transmits the SMS messages to an SMS message thread of either of mobile OS 122 or mobile OS 123, while also transmitting a notification of the SMS message to either of mobile OS 122 or mobile OS 123, in accordance with at least one embodiment. Moreover, process of acquiring data by mobile server application 220 can include, for example, breaking the SMS messages into smaller chunks, filtering redundant information of the SMS messages, or compressing the data of SMS messages.

Figure 2:
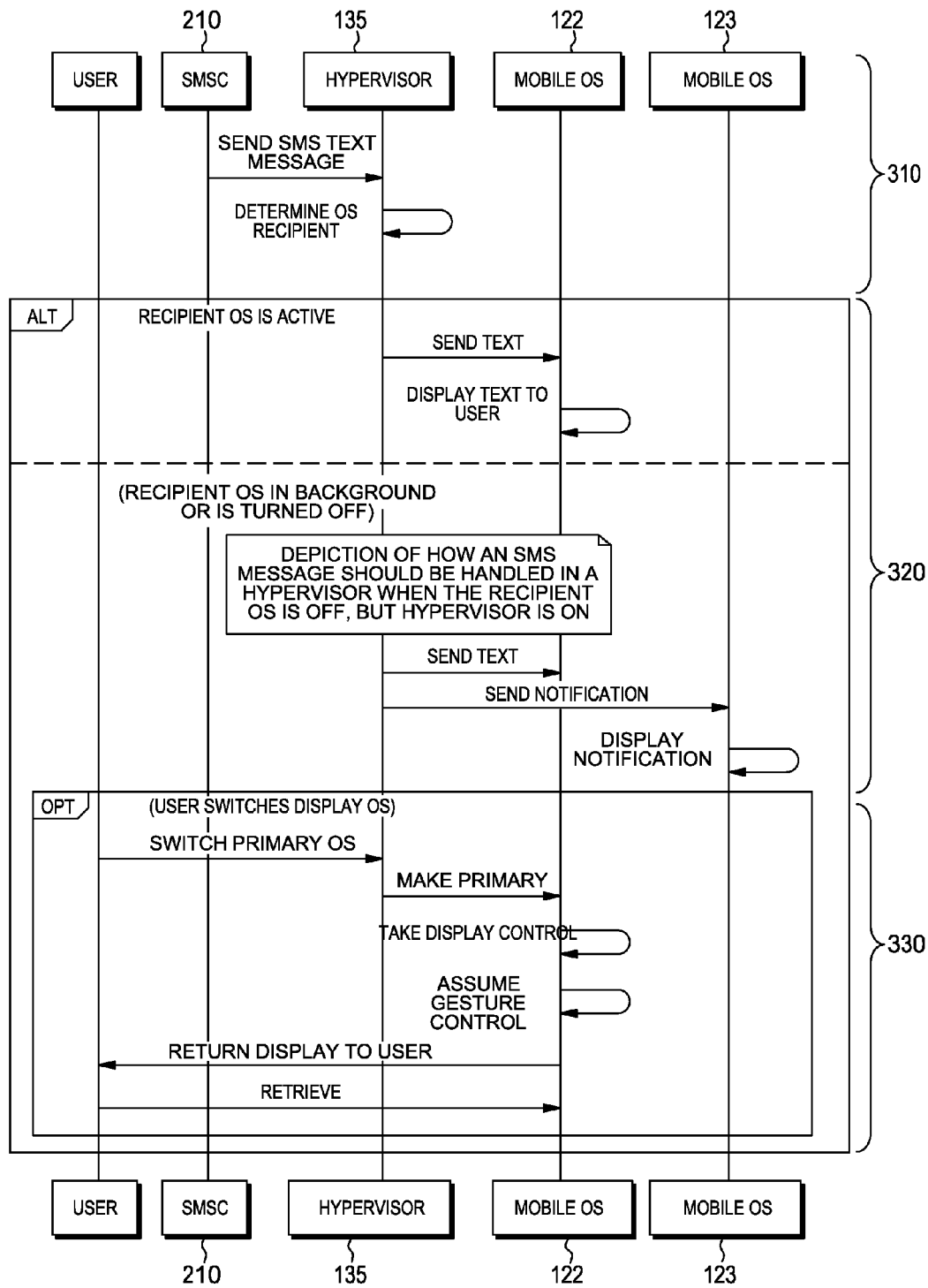
FIG. 2 is a message flow diagram illustrating transmission of SMS messages from a short message service center (SMSC) to a hypervisor and mobile operating systems of a mobile computing device, in accordance with embodiments of the present invention.

FIG. 2 is a message flow diagram illustrating transmission of SMS messages from SMSC 210 to hypervisor 135, mobile OS 122 and mobile OS 123, in accordance with embodiments of the present invention. According to FIG. 2, an SMS message is directed to a recipient OS (e.g., mobile OS 122, etc.). In the depicted embodiment, hypervisor 135 operates both mobile OS 122 and mobile OS 123 for transmitting SMS messages of SMSC 210 to an SMS message thread of either of mobile OS 122 or mobile OS 123, while also transmitting a notification of the SMS message to either of mobile OS 122 or mobile OS 123. (Flow 310). For example, each one of mobile OS 122 or mobile OS 123 can have a different mobile number or mobile directory of mobile computing device 105. Moreover, the user of mobile computing device 105 can manually specify priority or method of operation of transmission of SMS message to either of mobile OS 122 or mobile OS 123 by hypervisor 135 in mobile control network interfaces 124, 125. The user of mobile computing device 105 can further configure activation or power of either of mobile OS 122 or mobile OS 123, wherein if either of the mobile OS 122 or mobile OS 123 is inactive, hypervisor 135 stores the SMS messages in an SMS queue of mobile computing devices 105, while also transmitting a notification of the SMS message to either of an active mobile OS 122 or mobile OS 123 of the mobile computing device. (Flow 320).

Further, the user of mobile computing device 105 can also define, in mobile control network interfaces 124, 125, rules of operating transmission of the SMS messages by hypervisor 135 to either of mobile OS 122 or mobile OS 123. (Flow 330). The rules can define and distinguish how different types of SMS messages are transmitted to either of mobile OS 122 or mobile OS 123. For example, the rules of transmitting the SMS message by hypervisor 135 can include or be based on geographic origination of the SMS messages to SMSC 210, specific time of the SMS message at SMSC 210, or subject matter, including, for example, an urgent message notification of the SMS message. In this manner, hypervisor 135 can transmit the SMS message to either of mobile OS 122 or mobile OS 123 based on the defined rules, in accordance with the present invention.

In another example, the rules can further define a primary operating system of either of mobile OS 122 or mobile OS 123 which is designated to initially receive the SMS messages, control switching of the SMS message between either of mobile OS 122 or mobile OS 123, or control display of the SMS messages in either of mobile OS 122 or mobile OS 123. (Flow 320). Moreover, if an intended or designated mobile OS 122 or mobile OS 123 for transmitting the SMS messages based on the defined rules is inactive, hypervisor 135 queues the SMS messages in storage of mobile communications environment 100, while also transmitting a notification of the SMS message to either of an active mobile OS 122 or mobile OS 123, until or before the designated inactive mobile OS 122 or mobile OS 123 is active. Further, if the user of mobile computing device 105 does not define rules for transmitting the SMS messages by hypervisor 135 in mobile control interface of either mobile OS 122 or mobile OS 123, hypervisor 135 transmits the SMS message to either of an active mobile OS 122 or mobile OS 123.

Figure 3:
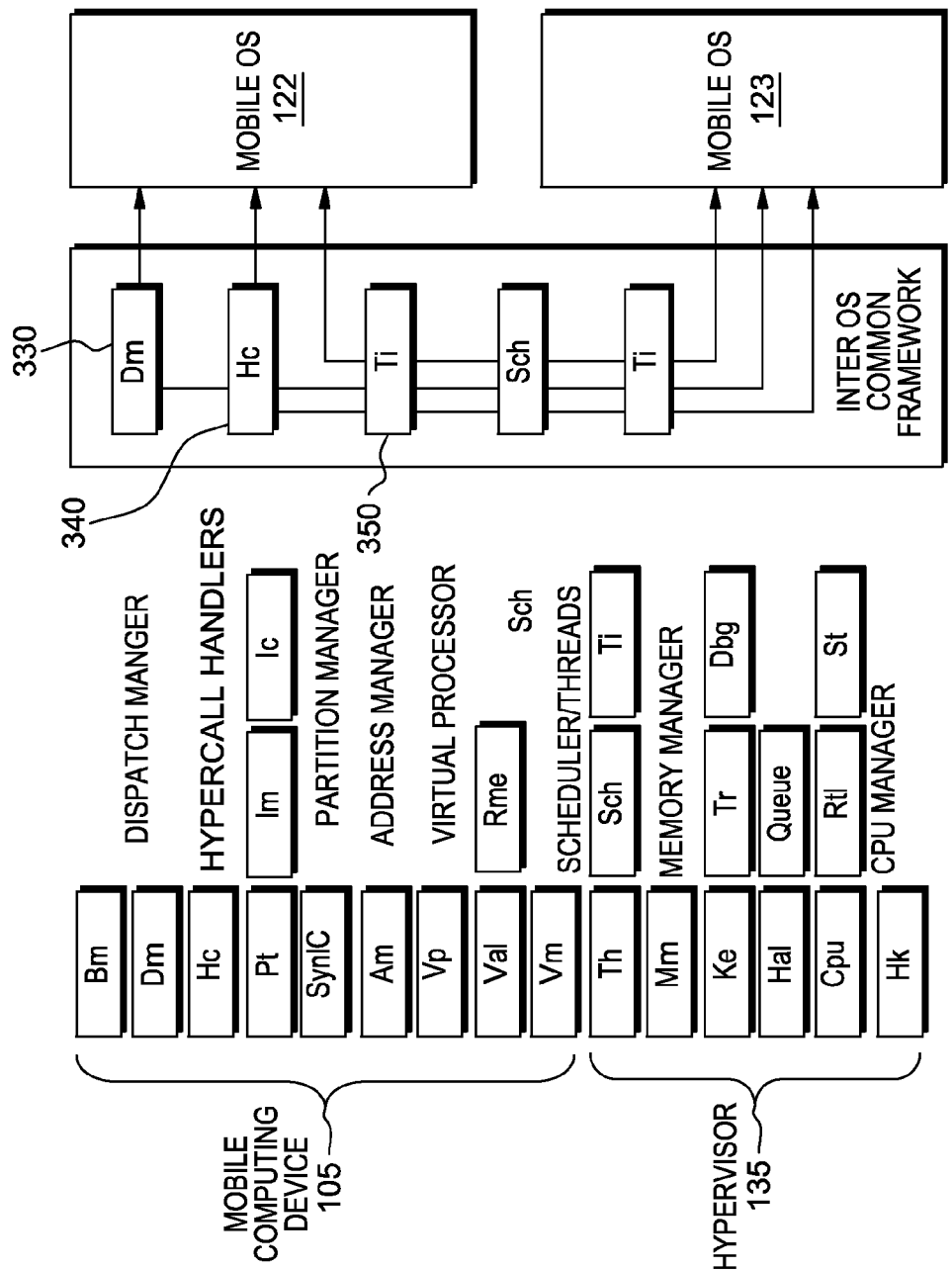
FIG. 3 depicts an embodiment of a layered hypervisor architecture of a mobile communications environment for transmitting SMS messages of an SMSC to a hypervisor of a mobile computing device, in accordance with embodiments of the present invention.

FIG. 3 depicts an embodiment of a layered hypervisor architecture of mobile communications environment 100 for transmitting SMS messages of SMSC 210 to hypervisor 135, wherein hypervisor 135 transmits the SMS message to an SMS message thread of mobile OS 122 or mobile OS 123, while also transmitting a notification of the SMS message to either of mobile OS 122 or mobile OS 123. For example, in the depicted environment, hypervisor 135 manages distribution of processor cycles for transmitting SMS message between mobile OS 122 or mobile OS 123. Dispatch manager 330 uses a dispatch cycle from processors to receive capacity of processor cycles for a dispatch window of transmission of the SMS messages. For example, dispatch manager 330 dispatches virtual processors on processor of hardware across dispatch cycles of processor. Hypercall handler 340 interrupts instructions of the transmitted SMS messages. Interruption of the SMS messages provides transmittal path execution of file systems of hypervisor during transmission of the SMS, wherein a partition manager manages logical partitions, and allocates resources to the different logical partitions of mobile computing environment 100. Hypervisor scheduler 350 threads schedule virtual processors to run on logical processors of mobile communications environment 100 during transmission of the SMS messages by hypervisor 135.

Figure 4:
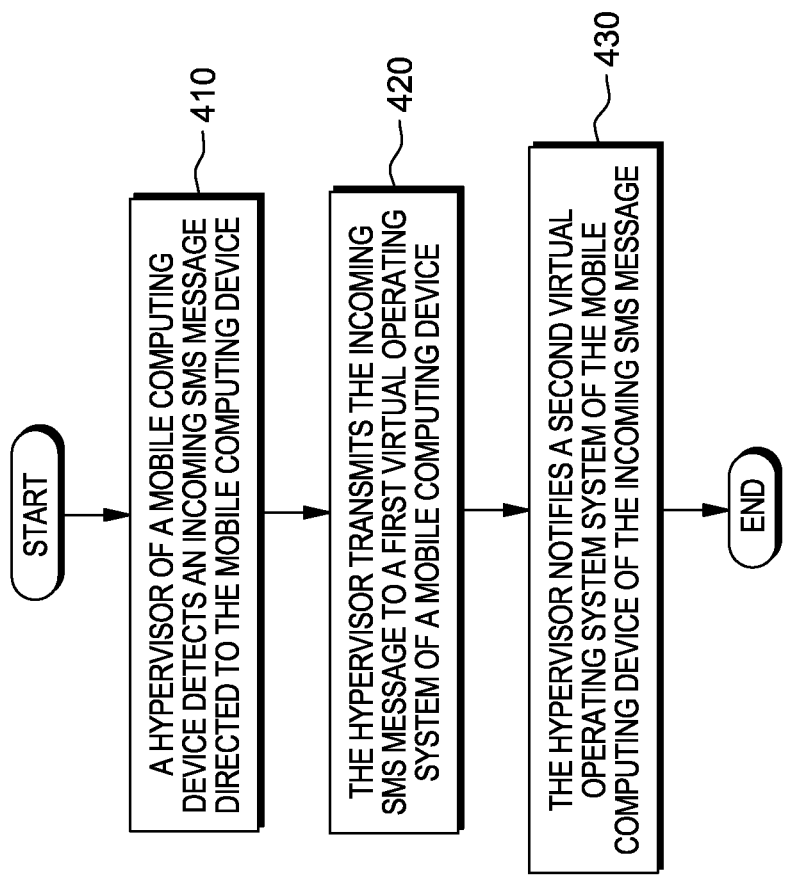
FIG. 4 is a flowchart depicting steps performed by a hypervisor of a mobile computing device to manage SMS messages within operating systems of the mobile computing device, in accordance with embodiments of the present invention.

FIG. 4 is a flowchart depicting steps performed by hypervisor 135 to detect SMS messages, and transmit the SMS message to an SMS thread of either of mobile OS 122 or mobile OS 123, while also transmitting a notification of the SMS message to either of mobile OS 122 or mobile OS 123. According to at least one embodiment, hypervisor 135 detects an incoming SMS message to mobile computing device 105 from SMSC 210. (Step 410). For example, as described above, SMSC 210 receives, stores, forwards, converts and delivers SMS messages to mobile server application 220. Moreover, the SMS messages are originated and received by service users or mobile server providers of mobile communications environment 100. The mobile service provider can be, for example, a telecommunications network provider of mobile communications environment 100, wherein the telecommunications network provider provides teleservices such as, for example, informational messaging or program messaging of the SMS messages to SMSC 210. Hypervisor 135 further transmits the incoming SMS message to an SMS thread of either of mobile OS 120, mobile OS 123. (Step 420).

For example, according to at least one embodiment, if either of mobile OS 122 or mobile OS 123 inactive, hypervisor 135 creates an SMS queue within mobile computing device 105 to store the SMS message to an active mobile OS 122 or mobile OS 123 and also transmits a notification of the incoming SMS message to SMS notification unit 128, 129 of inactive mobile OS 122 or mobile OS 123. For example, entry into the active or on mode by either of mobile OS 122 and mobile OS 123 may be configured automatically, by default by active/inactive modules 126, 127.

Hypervisor 135 further notifies either of mobile OS 122 or mobile OS 123 of the incoming SMS message. (Step 430). Each of mobile OS 122 and mobile OS 123 further includes SMS notification units 128, 129 for transmitting notifications of SMS messages between an active or inactive mobile OS 122 and mobile OS 123. According to at least one embodiment, hypervisor 135 detects an incoming SMS message to mobile computing device 105, and transmits the incoming SMS message to a SMS thread of either of mobile OS 122, mobile 123 while also transmitting a notification of the SMS message to SMS notification unit 128, 129 of mobile OS 122 and mobile OS 123. SMS notification unit 128, 129 provides notification of exiting or incoming SMS messages transmitted by hypervisor 135 to either of mobile OS 122 and mobile OS 123. If either of mobile OS 122 or mobile OS 123 inactive, hypervisor 135 creates an SMS queue within mobile computing device 105 to store the SMS message to an active mobile OS 122 or mobile OS 123 and also transmits a notification of the incoming SMS message to notification unit 128, 129 of inactive mobile OS 122 or mobile OS 123. Entry into the active or on mode by either of mobile OS 122 and mobile OS 123 may be configured automatically, by default by active/inactive modules 126, 127.

Also, entry into the active or on mode can also be manually configured by the user of mobile computing device 105 in the mobile control network interfaces 124, 125, wherein the user can select a manner in which to notify the user of the incoming SMS message transmitted by hypervisor 135 to either of mobile OS 122 or mobile OS 123. Further, entry into an inactive or off mode by either of mobile OS 122 and mobile OS 123 may involve disabling the active/inactive interfaces 126, 127 of mobile control network interfaces 124, 125. For example, entry into the inactive or off mode may be configured automatically, by default by active/inactive interfaces 126, 127 or by the user in active/inactive interfaces 126, 127, wherein the user selects a manner in which to notify the user of the incoming SMS message transmitted by hypervisor 135.

Figure 5:
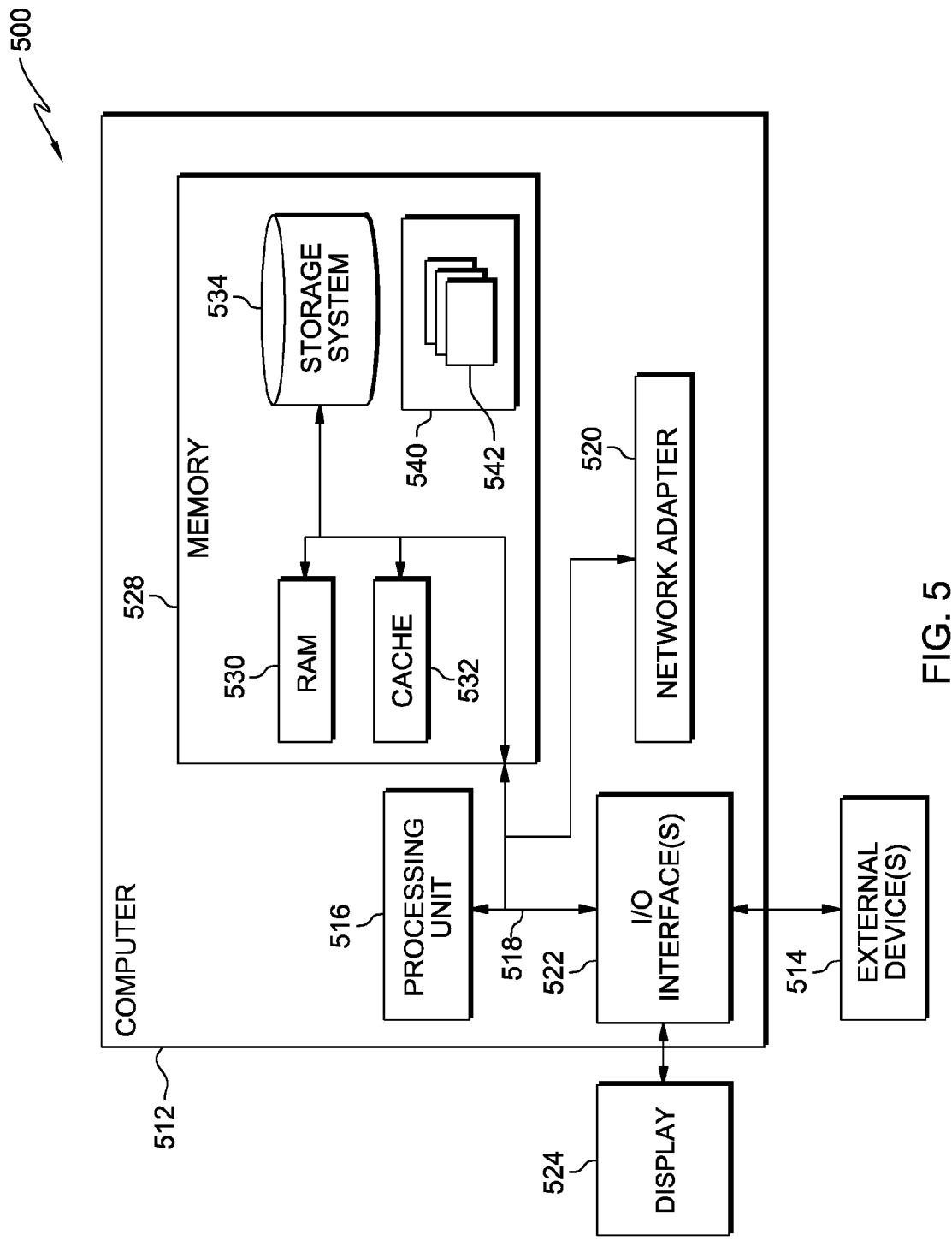
FIG. 5 illustrates a block diagram of components of a computer system in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Mobile computing device 105 and server device 111 can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 630 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Mobile OS 122, mobile OS 123 and mobile server application 220 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of mobile OS 122, mobile OS 123 and mobile server application 220 can be implemented as an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for transmitting short message service (SMS) messages and notifications within a virtualized wireless device within a virtualized wireless device have been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for transmitting short message service (SMS) messages and notifications of an incoming SMS message within a virtualized wireless device, the method comprising:
   detecting the incoming SMS message directed to the virtualized wireless device that comprises at least two virtual operating systems;
   determining an intended recipient of the detected incoming SMS message, wherein the intended recipient is at least one of a first virtual operating system and a second virtual operating system that are the at least two virtual operating systems on the virtualized wireless device;
   based on the determination of the intended recipient, detecting first configuration preferences associated with the first virtual operating system, and second configuration preferences associated with the second virtual operating system, for transmitting the detected incoming SMS message and sending a notification based on transmission of the detected incoming SMS message, wherein the first configuration preferences and the second configuration preferences are based on user configurations associated with user input;
   in response to the determination that the first virtual operating system is the intended recipient, and that the first virtual operating system is actively running, using a hypervisor associated with the virtualized wireless device to transmit the detected incoming SMS message to the first virtual operating system based on the first configuration preferences, and sending the notification of transmission of the detected incoming SMS message to the second virtual operating system based on the second configuration preferences, wherein sending the notification is performed concurrently with the transmission of the detected incoming SMS message;
   in response to the determination that the second virtual operating system is the intended recipient, and that the second virtual operating system is actively running, using the hypervisor to transmit the detected incoming SMS message to the second virtual operating system based on the second configuration preferences, and sending the notification of transmission of the detected incoming SMS message to the first virtual operating system based on the first configuration preferences, wherein sending the notification is performed concurrently with the transmission of the incoming SMS message;
   in response to determining that the intended recipient of the detected incoming SMS message is inactive, using the hypervisor to generate an SMS queue to store the detected incoming SMS message on the virtualized wireless device, while concurrently transmitting the notification of the detected incoming SMS message to a virtual operating system that is actively running, wherein the virtual operating system that is actively running is selected from the group consisting of the at least two virtual operating systems on the virtual wireless device; and
   wherein the first virtual operating system is active when it is powered on and displays a client configuration screen of the SMS message, and wherein the second virtual operating system is inactive when power is enabled to the first virtual operating system and transmission of the SMS message to the second virtual machine is disabled.

2. The method according to claim 1, wherein the user configurations are selected from a group consisting of a geographic origination of the detected incoming SMS message, a specific time that the detected incoming SMS message is transmitted, and a subject matter associated with the detected incoming SMS message.

3. The method according to claim 1, further comprising queuing the detected incoming SMS message for the intended recipient that is inactive until detecting that the intended recipient is actively running, and in response to detecting that the intended recipient is actively running, transmitting the detected incoming SMS message to the intended recipient.

4. A computer system for transmitting short message service (SMS) messages and notifications of an incoming SMS message within a virtualized wireless device, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
   program instructions to detect an incoming SMS message directed to a virtualized wireless device that comprises at least two virtual operating systems;
   program instructions to determine an intended recipient of the detected incoming SMS message, wherein the intended recipient is at least one of a first virtual operating system and a second virtual operating system that are the at least two virtual operating systems on the virtualized wireless device;

based on the determination of the intended recipient, program instructions to detect first configuration preferences associated with the first virtual operating system, and second configuration preferences associated with the second virtual operating system, for transmitting the detected incoming SMS message and sending a notification based on transmission of the detected incoming SMS message, wherein the first configuration preferences and the second configuration preferences are based on user configurations associated with user input;

in response to the determination that the first virtual operating system is the intended recipient, and that the first virtual operating system is actively running, program instructions to use a hypervisor associated with the virtualized wireless device to transmit the detected incoming SMS message to the first virtual operating system based on the first configuration preferences, and send the notification of transmission of the detected incoming SMS message to the second virtual operating system based on the second configuration preferences, wherein sending the notification is performed concurrently with the transmission of the detected incoming SMS message;

in response to the determination that the second virtual operating system is the intended recipient, and that the second virtual operating system is actively running, program instructions to use the hypervisor to transmit the detected incoming SMS message to the second virtual operating system based on the second configuration preferences, and send the notification of transmission of the detected incoming SMS message to the first virtual operating system based on the first configuration preferences, wherein sending the notification is performed concurrently with the transmission of the incoming SMS message;

in response to determining that the intended recipient of the detected incoming SMS message is inactive, program instructions to use the hypervisor to generate an SMS queue to store the detected incoming SMS message on the virtualized wireless device, while concurrently transmitting the notification of the detected incoming SMS message to a virtual operating system that is actively running, wherein the virtual operating system that is actively running is selected from the group consisting of the at least two virtual operating systems on the virtual wireless device; and wherein the first virtual operating system is active when it is powered on and displays a client configuration screen of the SMS message, and wherein the second virtual operating system is inactive when power is enabled to the first virtual operating system and transmission of the SMS message to the second virtual machine is disabled.

5. The computer system according to claim 4, wherein the user configurations are selected from a group consisting of a geographic origination of the detected incoming SMS message, a specific time that the detected incoming SMS message is transmitted, and a subject matter associated with the detected incoming SMS message.

6. The computer system according to claim 4, further comprising program instructions to queue the detected incoming SMS message for the intended recipient that is inactive until detecting that the intended recipient is actively running, and in response to detecting that the intended recipient is actively running, transmitting the detected incoming SMS message to the intended recipient.

7. A computer program product for transmitting short message service (SMS) messages and notifications within a virtualized wireless device, the computer program product comprising:

one or more computer-readable storage media and program instructions stored on the one or more computer readable storage media the program instructions comprising:

program instructions to detect an incoming SMS message directed to a virtualized wireless device that comprises at least two virtual operating systems;

program instructions to determine an intended recipient of the detected incoming SMS message, wherein the intended recipient is at least one of a first virtual operating system and a second virtual operating system that are the at least two virtual operating systems on the virtualized wireless device;

based on the determination of the intended recipient, program instructions to detect first configuration preferences associated with the first virtual operating system, and second configuration preferences associated with the second virtual operating system, for transmitting the detected incoming SMS message and sending a notification based on transmission of the detected incoming SMS message, wherein the first configuration preferences and the second configuration preferences are based on user configurations associated with user input;

in response to the determination that the first virtual operating system is the intended recipient, and that the first virtual operating system is actively running, program instructions to use a hypervisor associated with the virtualized wireless device to transmit the detected incoming SMS message to the first virtual operating system based on the first configuration preferences, and send the notification of transmission of the detected incoming SMS message to the second virtual operating system based on the second configuration preferences, wherein sending the notification is performed concurrently with the transmission of the detected incoming SMS message;

in response to the determination that the second virtual operating system is the intended recipient, and that the second virtual operating system is actively running, program instructions to use the hypervisor to transmit the detected incoming SMS message to the second virtual operating system based on the second configuration preferences, and send the notification of transmission of the detected incoming SMS message to the first virtual operating system based on the first configuration preferences, wherein sending the notification is performed concurrently with the transmission of the incoming SMS message;

in response to determining that the intended recipient of the detected incoming SMS message is inactive, program instructions to use the hypervisor to generate an SMS queue to store the detected incoming SMS message on the virtualized wireless device, while concurrently transmitting the notification of the detected incoming SMS message to a virtual operating system that is actively running, wherein the virtual operating system that is actively running is selected from the group consisting of the at least two virtual operating systems on the virtual wireless device; and wherein the first virtual operating system is active when it is powered on and displays a client configuration screen of the SMS message, and wherein the second virtual operating system is inactive when power is enabled to the first virtual operating system and transmission of the SMS message to the second virtual machine is disabled.

8. The computer program product according to claim 7, wherein the user configurations are selected from a group consisting of a geographic origination of the detected incoming SMS message, a specific time that the detected incoming SMS message is transmitted, and a subject matter associated with the detected incoming SMS message.

9. The computer program product according to claim 7, further comprising program instructions to queue the detected incoming SMS message for the intended recipient that is inactive until detecting that the intended recipient is actively running, and in response to detecting that the intended recipient is actively running, transmitting the detected incoming SMS message to the intended recipient.

\* \* \* \* \*